United States Patent [19]
Patin

[11] Patent Number: 5,437,467
[45] Date of Patent: Aug. 1, 1995

[54] STABILIZATION DEVICE FOR VEHICLE

[76] Inventor: Pierre Patin, 15, rue Buffon, 75005 Paris, France

[21] Appl. No.: 29,245

[22] Filed: Mar. 10, 1993

[30] Foreign Application Priority Data

Mar. 10, 1992 [FR] France ............................... 92 02822

[51] Int. Cl.$^6$ .......................................... B62D 61/00
[52] U.S. Cl. .................................. 280/112.2; 280/111
[58] Field of Search .................... 280/111, 109, 112.2, 280/771; 180/316

[56] References Cited

U.S. PATENT DOCUMENTS

| | | | |
|---|---|---|---|
| 2,489,968 | 11/1949 | Lyon | 280/112.2 |
| 3,781,031 | 12/1973 | Patin | 280/111 |
| 4,921,263 | 5/1990 | Patin | 280/112.2 |
| 4,974,863 | 12/1990 | Patin | 280/112.2 |
| 5,040,812 | 8/1991 | Patin | 280/112.2 |

FOREIGN PATENT DOCUMENTS 0369863  5/1990  European Pat. Off. .
2922691 12/1980  Germany .

*Primary Examiner*—Eric D. Culbreth
*Attorney, Agent, or Firm*—Pollock, Vande Sande & Priddy

[57] ABSTRACT

A stabilization device for a vehicle, including a primary part resting on the ground via wheels linked respectively by a suspension system to vertical rods of a deformable parallelogram allowing the vehicle to incline, and a secondary part suspended from the primary part, comprising a driver's seat and being rigidly fixed to a cross piece which carries sliding elements fitted with free rollers which rigidly lock the cross piece with at least one of the uprights of the deformable parallelogram to prevent the vehicle from falling over.

7 Claims, 4 Drawing Sheets

STABILIZATION DEVICE FOR VEHICLE

BACKGROUND OF THE INVENTION

Since the invention of the two-wheeled motorized vehicle, various means have been sought to give greater stability to this type of vehicle when stationary. The vehicle's small overall dimensions offer major advantages in terms of driving in traffic and parking, and enhanced stability would make it possible to enclose the vehicle and provide it with the same level of comfort and safety as three- or four-wheeled vehicles.

Applicant's U.S. Pat. Nos. 4,921,263 and 4,974,863, represent the most recent state of the technique. Their basic principle is that the vehicle comprises two elements, chassis and body, the body being pivoted on the chassis in such a way that, whenever the whole vehicle departs from the apparent vertical due to gravitational and centrifugal forces, a link is created between the chassis and body causing the center of gravity of the body to rise relative to the chassis, which in turn raises the center of gravity of the whole vehicle. This movement consumes energy and is therefore clearly impossible unless some external contribution of energy exits which generates vehicle stability.

SUMMARY OF THE INVENTION

It is the object of the invention to improve certain devices used in U.S. Pat. No. 4,974,863 by applying a principle that makes it impossible for the vehicle to fall since any such fall would cause the vehicle to rise.

In accordance with the invention, such an inclinable vehicle comprises:
- a primary part (I) which rests on the ground A, centered on a normally vertical mid-plane, and comprising at least two bearing axle assemblies, respectively front and rear, one bearing axle assembly carrying two spaced wheels and the other at least a third wheel;
- a secondary part (II), suspended from the primary part, which, under the combined effects of gravitational and centrifugal forces, is able to incline relative to the primary part by turning about a suspension axis parallel to the ground and to mid-planes P1, P2 of the primary part and secondary part;
- a deformable parallelogram system associated with the two-wheel bearing axle assembly, allowing the primary part and the two wheels to incline relative to the ground, comprising two vertical side bars parallel to the mid-plane, the ends of the side bars being hinged with two parallel equalizers which in turn pivot respectively around two axles on the primary part located one above the other in the mid-plane and parallel to the ground, the axles of the two wheels being respectively mounted on the vertical side bars perpendicularly to the mid-plane. The secondary part inclines freely with the primary part whenever their mid-planes are substantially coincident, the secondary part bearing on the primary part through an angular locking system when its mid-plane departs, excepting play, from the mid-plane of the primary part in the direction in which the vehicle is tending to fall.

The locking system comprises a cross piece, locked angularly to the secondary part and having two ends which bear, respectively, against two carriages mounted for sliding movement respectively on the two vertical side bars of the parallelogram, the cross piece selectively controlling the locking of at least one of the carriages on the corresponding vertical side bar in order to angularly lock the secondary part relative to the primary part. The cross piece is suspended from the primary part by a system of two rods, the lower end of each rod being hinged with the cross piece, and the upper end of each rod being hinged with the primary part. The lower articulation points on the cross piece are symmetrically spaced either side of the mid-plane of the secondary part, and the upper articulation points are symmetrically spaced either side of the mid-plane of the primary part. The rods are orientated in such a way as to upwardly converge on a point constituting an instantaneous rotational center and a virtual suspension axis of the cross piece. Each end of the cross piece is locked angularly to the corresponding carriage by a sliding link which allows the cross piece to slide longitudinally while maintaining its orientation relative to the carriage. Each carriage is fitted with a means for locking its sliding movement along the length of the corresponding vertical side bar in the direction of slide corresponding to the meeting point of the rods moving away from the mid-plane of the primary part, the sliding movement remaining uninhibited in the opposite direction corresponding to the point moving towards the mid-plane. The secondary part, which may consist solely of the driver's seat, is suspended from the primary part by rods similar to those used to suspend the cross piece. If the stabilizing wheel set is the rear wheel get or an intermediary wheel set, the cross piece can be rigidly locked to the secondary part.

The stabilizing device can be designed either so that the means for locking the sliding of the carriages prevents the downward movement, along the corresponding vertical side bar, of the carriage located on the side towards which the mid-plane of the secondary part departs from the mid-plane of the primary part, and permits the downward movement of the opposite carriage, or, alternatively, so that the means for locking the sliding of the carriages prevents the upward movement, along the corresponding vertical side bar, of the carriage located on the side opposite the one towards which the mid-plane of the secondary part departs from the mid-plane of the primary part, and permits the upward movement of the opposite carriage.

Since a two-wheel terrestrial vehicle is obviously not inherently stable, a self-stabilizing vehicle will comprise at least three wheels, with either two at the back and one at the front, or two at the front and one at the back. A version with two wheels at the front and two at the back, and a solution with two intermediate wheels, plus one wheel at the back and one at the front, is also possible.

Each two wheel stabilizer system (front, rear or intermediary) is equipped in the same way to ensure stability. FIGS. 1 to 6 show, by way of example, the stabilization system for a front twin-wheel assembly, i.e., an articulated system of two wheels mounted in parallel such that when the vehicle is travelling along, this assembly is equivalent to a single wheel aligned with the axial plane of the vehicle.

BRIEF DESCRIPTION OF THE DRAWINGS

The invention will now be described with reference to the accompanying drawings.

DESCRIPTION OF PREFERRED EMBODIMENT

Figure 1:
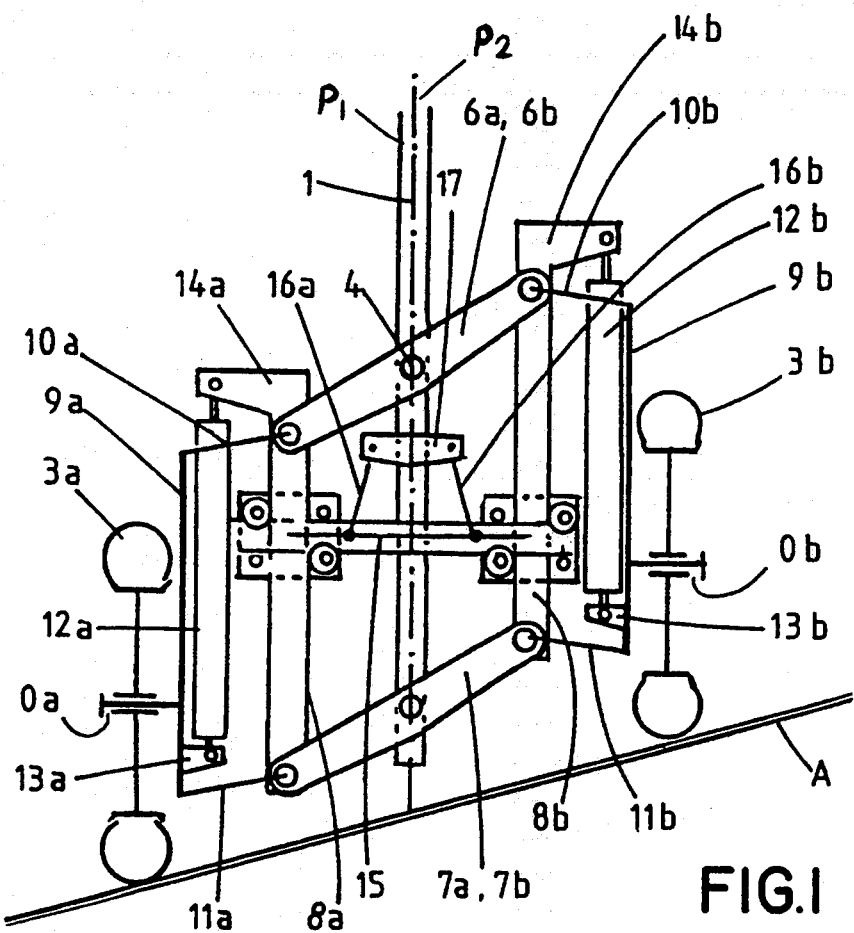
FIG. 1 is a schematic front view of the articulated assembly according to the invention.
Figure 2:
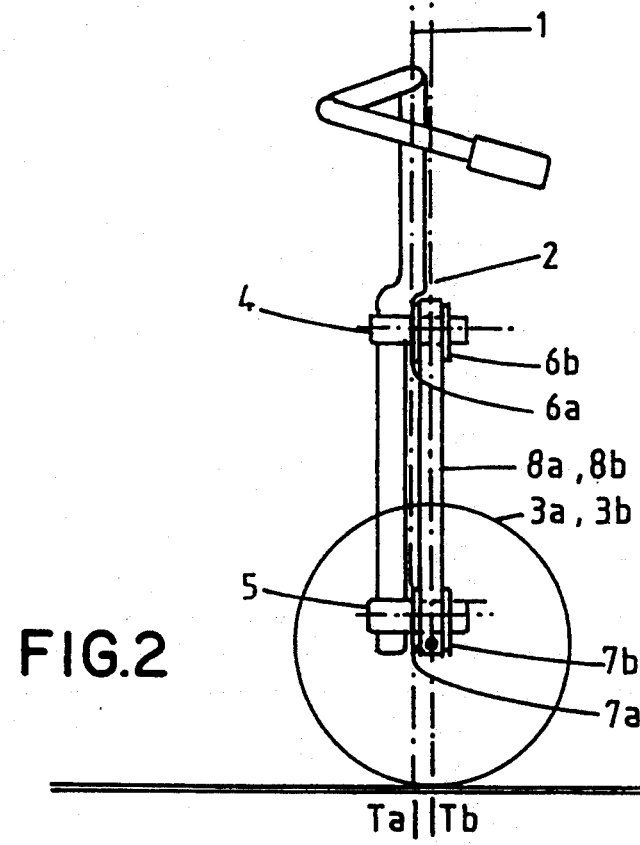
FIG. 2 is a schematic side view.

In FIGS. 1 and 2, 1 denotes the center axis of the steering column. Since the vehicle is vertical at standstill, this axis is vertical and lies in the mean vertical plane of the vehicle. Line 2 is the mean plane of the articulated device shown in FIG. 1 on the axial plane of the vehicle. This mean plane is parallel to axis 1 and passes through axles Oa and Ob of the two wheels 3a and 3b and through the wheel-ground contact points Ta, Tb. To ensure straight-line stability, axis 2 is slightly behind axis 1. However, the center of gravity of the rotary assembly will preferably be in front of this same axis, allowing the vehicle to be steered by simply inclining it.

Steering column 1 is fitted with two pins 4,5 on which pivot equalizers 6a, 6b, 7a, 7b, which, together with vertical side bars 8a, 8b, form an articulated parallelogram. Each wheel axle Oa, Ob is fixed to a plate 9a, 9b which is hinged via rods 10a, 10b, 11a, 11b to the ends of the corresponding vertical bar 8a, 8b so as to constitute, in a known way, a device in the form of a parallelogram or trapezium ensuring the movements of the suspension of each wheel. These movements are controlled by damping springs 12a, 12b hinged to a lug 13a, 13b integral with the plate and to a bracket 14a, 14b integral with the vertical bar.

A cross piece 15 hangs by two rods 16a, 16b from a double bracket 17 carried by the steering column. This cross piece is fitted with two locking carriages 18a, 18b, the operation of which will now be described with reference to FIGS. 3, 4 and 5.

Figure 3:
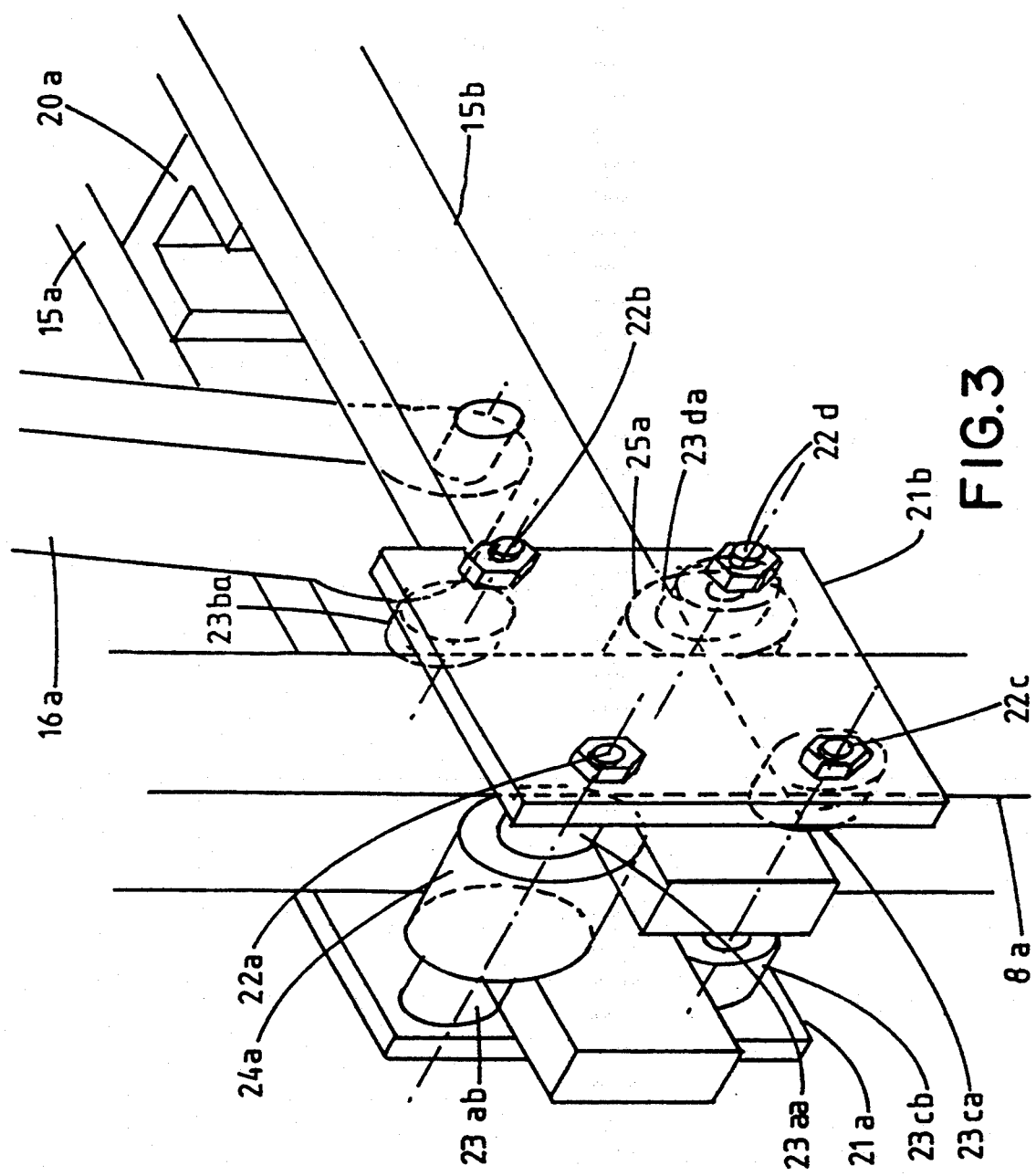
FIG. 3 is a perspective view of the locking device (carriage and locking bar).
Figure 4:
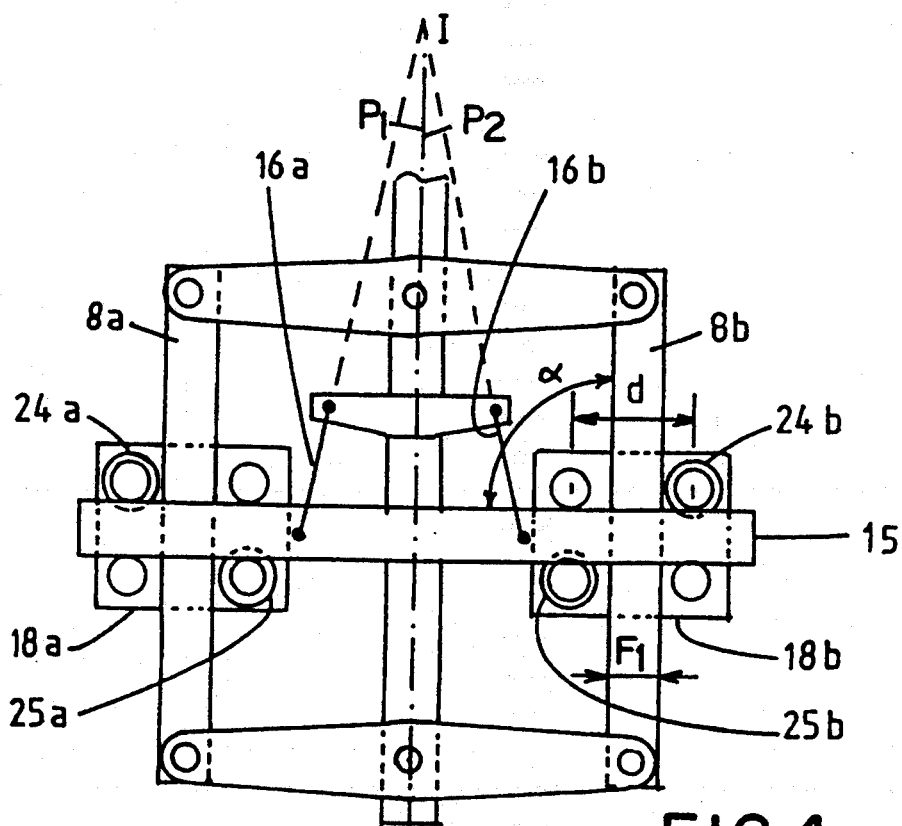
FIG. 4 shows the locking system in the free position.

FIG. 3 is a perspective view of the locking element formed by suspended cross piece 15, carriage 18a and vertical bar 8a. As will be shown below, the movement of cross piece 15 will be advantageously controlled by the driver's seat 30 which is suspended in the same way at said cross piece 15. However, to explain the working of the system, it is sufficient to consider that cross piece 15 is only subjected to forces of inertia (gravitational force and centrifugal force).

As mentioned above, cross piece 15, made up of two flat bars 15a, 15b rigidly assembled by two spacers 20a, is suspended from bracket 17 by two inclined rods 16a, 16b.

A locking carriage 18a is made up of two plates 21a, 21b assembled by cylindrical elements 22a, 22b, 22c, 22d, these elements also serving as axles for bearings 23aa, 23ab, 23ba, 23bb, 23ca, 23cb, 23da, 23db and for free rollers 24a and 25a.

Bearings 23 maintain the strict sliding motion of the carriage on cross piece 15, plates 21a and 21b sliding along this cross piece by easy fitting.

When the system is in the balanced position (FIG. 4), there is play between the free rollers and the vertical side bars. The overall play inside a carriage, equal to the difference d−h between the distance d separating two cylindrical spacers on the same level and thickness h of the vertical side bar, allows its vertical side bar to slide without rubbing when it moves, by the deformation of the parallelogram, relative to cross piece 15. The cross piece moves slightly about the instantaneous center of rotation located at the meeting point of the extensions of rods 16a, 16b.

Figure 5:
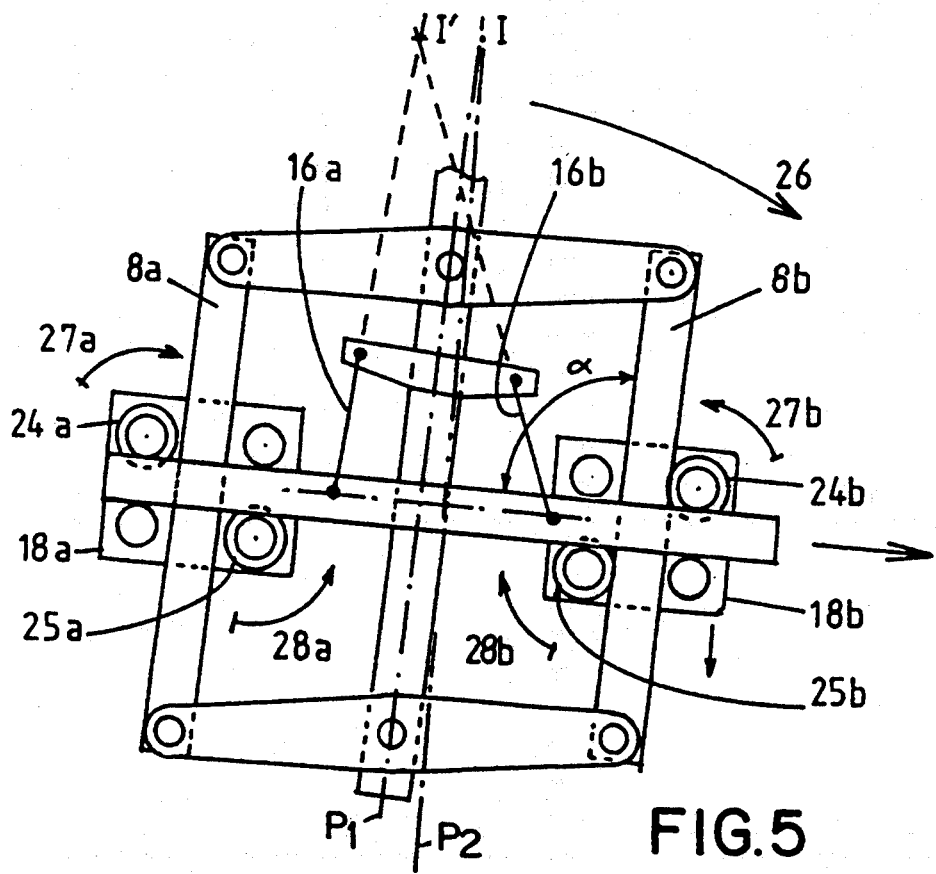
FIG. 5 shows the locking system in the locked position.

It will now be assumed that gravitational or centrifugal forces are tending to make the system fall in the direction indicated by arrow 26 (FIG. 5). These forces cause cross piece 15 to move to the right and its instantaneous center of rotation to the left to position B'. Cross piece 15 is therefore subjected to both a lateral movement to the right and a rotational movement in the direction opposite that indicated by arrow 26. Angle a between cross piece 15 and vertical side bar 8b, which was originally 90°, now becomes obtuse, and free rollers 24b and 25b bear against vertical side bar 8b, carriage 18b tending to travel down this vertical side bar.

Free rollers 24b, 25b are mounted so as to be able to turn in the direction indicated by arrows 27b, 28b, and not in the opposite direction. When they bear against vertical side bar 8b, they stop the movement of carriage 18b and rigidly lock it to the vertical side bar. If the fall were to continue, the rotation of the vertical side bar would in turn rotate the cross piece causing it to lift the entire vehicle through rods 16a, 16b. This action exerts torque on free wheels 24b, 25b and obviously tends to increase the locking and therefore stop the fall. In contrast, any return movement towards equilibrium is made possible by a free roller which turns in its normal direction.

It can also be seen that play will increase on the left side of the figure. If, in contrast, locking cross piece 15 were pushed back to the left, by centrifugal force for example, inclination would be permitted by both carriage 18b, which would offer maximum play, and carriage 18a, whose free rollers would turn in the permitted direction.

Theoretically, such a system would be sufficient to confer both stability when stationary and freedom of inclination in the appropriate direction in regard to centrifugal force for a vehicle in accordance with the invention. In practice, the system is made slightly more complex because of the driver's behavior since he leans to the side in anticipation of the appearance and development of centrifugal force. For this reason, the locking cross piece has to be brought under the control of the driver's seat. The seat is suspended by a system of rods in exactly the same way as cross piece 15. Seat movements are reproduced on cross piece 15 by a strictly conventional cable or bar transmission system.

Figure 6:
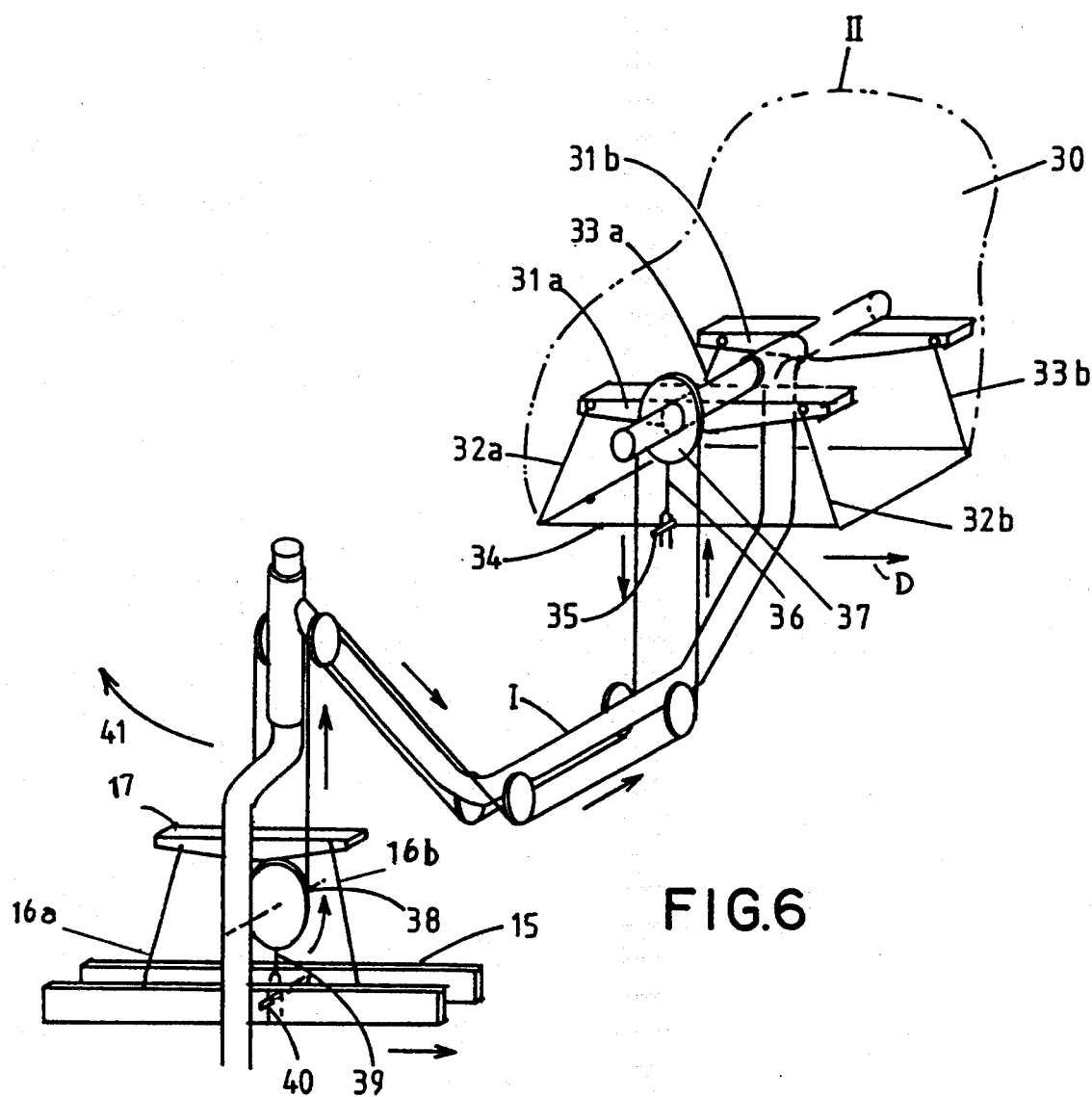
FIG. 6 shows the suspension of the driver's seat and its link with the locking bar.

As shown in FIG. 6, seat 30 is suspended by rods 32a, 32b, 33a, 33b from double brackets 31a, 31b. Bar 34, fixed to the base of the seat, causes pulley 37 to rotate by means of a pin 35 and a fork 36. Pulley 37 is fitted with a cable which, by bearing on guide pulleys, commands the rotation of pulley 38 which, via fork 39 and pin 40, reproduces the movement of bar 34 on cross piece 15. Fork 39 is preferably elastic in order to limit the forces in this transmission system.

When the driver wishes to steer to the right, for example (arrow 41), he leans to his right, causing bar 34 to move to his left. The centrifugal forces applied to the seat and to the driver act in the same way. Under these conditions, cross piece 15 also moves to the left, thus premitting inclination to the right.

Arrangements slightly different from those described above but tending towards the same results could be used, for example, in the production of the elastic and spring damping system of the suspension and in the link between the secondary part and the cross piece.

I claim:

1. Stabilization device for an inclinable vehicle comprising:
   (a) a primary part (I) centered on a normally vertical mid-plane (P1) and resting on the ground through a front bearing assembly mounted on a steering column (1) and carrying two spaced wheels (3a, 3b) and a rear bearing assembly carrying at least a third wheel;
   (b) a secondary part (II) having a mid-plane (P2) and mounted on said primary part (I) for rotation about a suspension axis parallel to the ground (A) and to said mid-planes of said primary and secondary parts, said secondary part (II) comprising at least a driver's seat (30);
   (c) an inclination system comprising a deformable parallelogram and associated with said bearing assembly having two wheels (3a, 3b) for allowing inclination of said primary part and of said wheels relative to the ground, said inclination system comprising two side bars (8a, 8b), parallel to the mid-plane (P1) of said primary part (I) and hinged at ends of said side bars with two parallel equalizers (6a, 6b; 7a, 7b) articulated on a central element of said primary part (I), respectively around two axles (4, 5) located one above the other in said mid-plane (P1) of said primary part and parallel to the ground (A), both wheels of said bearing assembly having axles (Oa, Ob) respectively mounted on both said side bars (8a, 8b) perpendicularly to said mid-plane (P1) of said primary part;
   (d) an angular locking system for allowing freely inclination of said secondary part (II) with said primary part (I) whenever their mid-planes (P2, P1) are substantially coincident and for making said secondary part (II) angularly integral with said primary part (I) whenever said mid-plane (P2) of said secondary part moves away from said mid-plane (P1) of said primary part (I) in a direction in which said vehicle is tending to incline;
   (e) said angular locking system comprising a cross piece (15) angularly integral with said secondary part (II) and extending between said side bars (8a, 8b), and two locking carriages (18a, 18b) respectively slidably mounted along said side bars (8a, 8b);
   (f) said cross piece (15) having two ends respectively angularly locked with said two carriages, each by a sliding link allowing each end of said cross piece (15) to slide longitudinally on a corresponding locking carriage (18a, 18b) while maintaining its orientation relative to said corresponding carriage (18a, 18b);
   (g) said cross piece (15) being suspended from said primary part (I) by a system of two rods (16a, 16b) each having a lower end and an upper end, the lower ends being hinged with said cross piece (15) respectively around two lower articulation points (41a, 41b) symmetrically spaced either side of said mid-plane (P2) of said secondary part (II) and the upper ends being hinged with the primary part (I) respectively around two upper articulation points (42a, 42b) symmetrically spaced either side of said mid-plane (P1) of said primary part (I);
   (h) said two rods (16a, 16b) converging in a meeting point (B) constituting an instantaneous center of rotation of said cross piece (15);
   (i) said cross piece (15) remaining perpendicular to said mid-planes (P1, P2) and said locking carriages (18a, 18b) sliding freely along the corresponding side bars (8a, 8b) whenever said mid-planes (P1, P2) are substantially coincident;
   (j) each of said locking carriages being fitted with a means for locking its sliding movement along the length of the corresponding side bar (8a, 8b) in a downward direction of slide and for allowing the sliding movement remaining uninhibited in an upward opposite direction.

2. Stabilization device as claimed in claim 1, wherein the means for locking the sliding of the carriages prevents the downward movement, along the corresponding vertical side bar, of the carriage located on the side towards which the mid-plane of the secondary part moves away from the mid-plane of the primary part, and permits the downward movement of the opposite carriage.

3. Stabilization device as claimed in claim 1, wherein the means for locking the sliding of the carriages prevents the upward movement, along the corresponding vertical side bar, of the carriage located on the side opposite the one towards which the mid-plane of the secondary part moves away from the mid-plane of the primary part, and permits the upward movement of the opposite carriage.

4. Stabilization device as claimed in claim 1 wherein the upper parts of the two rods from which the cross piece is suspended are respectively hinged to two opposed brackets carried by said steering column of said primary part.

5. Stabilization device as caimed in claim 1 wherein the cross piece is suspended by rods from the primary part independent of the secondary part and wherein the secondary part is suspended from the primary part by rods similar to the rods from which the cross piece is suspended, said cross piece being linked to said secondary part by an angle transmission system in such a way that said cross piece follows angular movements of said secondary part relative to said primary part.

6. Stabilization device as claimed in claim 5, wherein at least the driver's seat is suspended from the primary part by two pairs of rods arranged in two parallel planes at right angles to said mid-plane of said primary part, the rods of each pair having lower ends hinged with said seat at two points symmetrically spaced either side of the mid-plane of said seat, and upper ends hinged with said primary part, at two points symmetrically spaced either side of the mid-plane of said primary part and at a distance that is less than a spacing of the lower hinge points, in such a way that the two pairs of rods upwardly converge on an axis constituting a virtual suspension axis of said seat on said primary part, said cross piece being suspended from said primary part by rods oriented in the same way and linked to the seat by an angular transmission system without play so as to reproduce movements of said seat.

7. Stabilization device as claimed in claim 1, wherein the bearing axle assembly with which the deformable parallelogram system is associated is the front steering bearing axle assembly.

* * * * *